(12) United States Patent
Matt et al.

(10) Patent No.: US 10,874,278 B2
(45) Date of Patent: Dec. 29, 2020

(54) GROUND WORKING SYSTEM WITH MULTIPLE CHARGING STATIONS

(71) Applicant: Andreas Stihl AG & Co. KG, Waiblingen (DE)

(72) Inventors: Sebastian Matt, Kufstein (AT); Samuel Zoettl, Birgitz (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 52 days.

(21) Appl. No.: 16/000,538

(22) Filed: Jun. 5, 2018

(65) Prior Publication Data
US 2018/0353040 A1 Dec. 13, 2018

(30) Foreign Application Priority Data
Jun. 9, 2017 (EP) ..................... 17400033

(51) Int. Cl.
*A01D 34/00* (2006.01)
*A47L 9/28* (2006.01)
(Continued)

(52) U.S. Cl.
CPC .......... *A47L 9/2894* (2013.01); *A01D 34/008* (2013.01); *A47L 9/2873* (2013.01);
(Continued)

(58) Field of Classification Search
CPC .. A47L 9/2894; A47L 9/2873; A47L 2201/06; A47L 2201/022; A47L 2201/04;
(Continued)

(56) References Cited

U.S. PATENT DOCUMENTS 8,106,626 B2 1/2012 Li et al.
2005/0230166 A1 10/2005 Petersson et al.
(Continued)

FOREIGN PATENT DOCUMENTS

DE 202013101894 U1 8/2014
DE 202013101894 U1 9/2014
(Continued)

OTHER PUBLICATIONS

Anonymous: "Husqvarna Automower 230 ACX, Reviews— Product Review.com.au", May 18, 2016, XP055425034, pp. 1 to 10, URL:https://www.productreview.com.au/p/husqvarna-automower-230acx-220ac-210c/m/230acx.html.
(Continued)

*Primary Examiner* — Yuen Wong
(74) *Attorney, Agent, or Firm* — Walter Ottesen, P.A.

(57) ABSTRACT

A ground working system has at least one self-driving ground working device, wherein the operating region (A) of the ground working device is determined by an edge boundary. The ground working device travels automatically within the operating region (A) along a traveling path (W), wherein the ground working device has a drive, a control unit and an in-device battery for supplying energy to the ground working device. A charging station for charging the battery of the ground working device is also provided. The charging station is set up on the edge boundary without interrupting the edge boundary. The ground working device goes to the charging station for charging the battery as required.

16 Claims, 3 Drawing Sheets

(51) Int. Cl.
*G05D 1/02* (2020.01)
*G05D 1/00* (2006.01)

(52) U.S. Cl.
CPC ......... *G05D 1/0016* (2013.01); *G05D 1/0225* (2013.01); *G05D 1/0272* (2013.01); *G05D 1/0278* (2013.01); *A47L 2201/022* (2013.01); *A47L 2201/04* (2013.01); *A47L 2201/06* (2013.01); *G05D 2201/0215* (2013.01)

(58) Field of Classification Search
CPC .... A01D 34/008; A01D 69/02; G05D 1/0016; G05D 1/0225; G05D 1/0278; G05D 1/0272; G05D 2201/0215
See application file for complete search history.

(56) References Cited

U.S. PATENT DOCUMENTS

| | | |
|---|---|---|
| 2011/0153172 A1 | 6/2011 | Anderson |
| 2011/0202307 A1* | 8/2011 | Petereit ............... A01D 34/008 702/150 |
| 2012/0158236 A1 | 6/2012 | Chung et al. |
| 2013/0006418 A1* | 1/2013 | Tian ...................... A47L 9/2805 700/245 |
| 2014/0324246 A1 | 10/2014 | Biber et al. |
| 2015/0328775 A1* | 11/2015 | Shamlian ............... B25J 9/1676 700/258 |
| 2016/0014955 A1 | 1/2016 | Hans |
| 2017/0020064 A1 | 1/2017 | Doughty et al. |
| 2017/0215336 A1 | 8/2017 | Andriolo et al. |
| 2018/0255704 A1 | 9/2018 | Kamfors et al. |
| 2018/0303031 A1 | 10/2018 | Araki et al. |
| 2018/0352728 A1 | 12/2018 | Ritzer et al. |
| 2018/0352729 A1 | 12/2018 | Matt et al. |
| 2018/0352733 A1 | 12/2018 | Matt et al. |
| 2018/0352734 A1 | 12/2018 | Matt et al. |

FOREIGN PATENT DOCUMENTS

| | | |
|---|---|---|
| EP | 1906205 A1 | 4/2008 |
| EP | 1933467 A2 | 6/2008 |
| EP | 2269433 A1 | 1/2011 |
| EP | 2390741 A2 | 11/2011 |
| EP | 2656718 A1 | 10/2013 |
| EP | 2658073 A1 | 10/2013 |
| EP | 2667271 A1 | 11/2013 |
| EP | 2945037 A2 | 11/2015 |
| EP | 3069593 A1 | 9/2016 |
| WO | 03104908 A1 | 12/2003 |
| WO | 2013/141206 A1 | 9/2013 |
| WO | 2014158060 A1 | 10/2014 |
| WO | 2015072897 A1 | 5/2015 |
| WO | 2016102143 A1 | 6/2016 |
| WO | 2016103068 A1 | 6/2016 |
| WO | 2016178616 A1 | 11/2016 |
| WO | 2018060966 A1 | 4/2018 |

OTHER PUBLICATIONS

Anonymous: "Rasenmaeher Roboter Signalverstaerker", May 17, 2016, XP055425027, pp. 1 to 7, URL:https://web.archive.org/web/20160517003655/http://robomaeher.de/blog/rasenmaher-roboter-signalverstarker/.

* cited by examiner

GROUND WORKING SYSTEM WITH MULTIPLE CHARGING STATIONS

CROSS REFERENCE TO RELATED APPLICATION

This application claims priority of European patent application no. 17 400 033.1, filed Jun. 9, 2017, the entire content of which is incorporated herein by reference.

FIELD OF THE INVENTION

The invention relates to a ground working system including at least one self-driving ground working device, wherein the operating region of the ground working device is determined by an edge boundary. The ground working device travels automatically within the operating region along a traveling path, for which purpose the ground working device has a drive, a control unit and an in-device battery for supplying energy to the ground working device. The ground working system also includes a charging station for charging the battery of the ground working device.

BACKGROUND OF THE INVENTION

It is known to operate a self-driving ground working device in an operating region that is bounded by a boundary wire. The ground working device travels automatically within the operating region over a random, predetermined or automatically planned traveling path. A base station of the system is electrically connected to the boundary wire and transmits onto the boundary wire a wire signal, the electromagnetic field of which induces a reception signal in a reception coil of the ground working device. The reception signal is processed in a control unit for controlling the ground working device and the ground working device is controlled correspondingly. For charging the battery, the base station is configured at the same time as a charging station.

Ground working systems including multiple self-driving ground working devices have also been proposed, in particular a system including multiple lawnmowers working an operating area in a combined manner. In the case of a ground working system including a first and a second self-driving ground working device, there may already be breaks in the operation of the system when the first ground working device is being charged in the base station configured as a charging station and the second ground working device likewise goes to the base station configured as a charging station because of a depleted battery charge. On account of the still continuing charging operation in the occupied base station, the second ground working device must wait before the base station. Work is interrupted. If more than two ground working devices are used within a ground working system, there can be considerable breaks in operation if there is only one charging station in the system and a number of ground working devices have to be charged at the same time.

SUMMARY OF THE INVENTION

It is an object of the invention to provide a ground working system having at least one self-driving ground working device wherein waiting times and/or long traveling distances for charging the battery of a ground working device are avoided.

The object can, for example, be achieved via a ground working system including: at least one self-driving ground working device, wherein an operating region (A) of the at least one self-driving ground working device is determined by an edge boundary; the at least one self-driving ground working device being configured to travel automatically within the operating region (A) along a traveling path (W); the at least one self-driving ground working device having a drive, a control unit and an in-device battery for supplying energy to the self-driving ground working device; at least one charging station for charging the in-device battery of the at least one self-driving ground working device; one of the at least one charging stations is set up on the edge boundary without interrupting the edge boundary; and, the at least one self-driving ground working device is configured to go to the at least one charging station for charging the in-device battery.

A charging station which is simply set up and positioned on the edge boundary without interrupting the edge boundary is provided. In this case, the edge boundary is not changed, interrupted or adapted. No adaptation work has to be carried out when setting up and positioning the charging station on the edge boundary. The edge boundary itself is not changed or otherwise adapted.

Even when using only one ground working device, especially on large complex areas, it may be advisable to use multiple charging stations in the operating region, in order to minimize unnecessary trips and traveling times.

The ground working device expediently goes to the charging station along the edge boundary. If the user sets up a charging station on the edge boundary, a ground working device traveling on the edge boundary is certain to find the charging station without changes to the ground working system having to be performed.

A charging station advantageously has a station transmitter, which transmits a status signal in dependence on a ground working device docked to the charging station. A ground working device going to the charging station can thus detect on the basis of a received status signal whether the charging station is free to enter.

The status signal is received in the ground working device by a receiver, and is processed in the ground working device. A status signal, which for example indicates the presence of a ground working device in the charging station, is processed in the control unit of the ground working device in such a way that for example an occupied charging station is bypassed. The transmitted "status signal" may also indicate a defect or a failure of the charging station. The "status signal" may also represent an indication that it is "free", which indicates that the charging station is ready for charging.

Advantageously, multiple autonomously operating ground working devices are provided in the operating region, so that even areas that are large and/or labyrinthine and complicated to travel over can be reliably worked in a predeterminable time period.

If in a ground working system with multiple ground working devices and multiple charging stations a charging station is occupied by a docked ground working device, the station transmitter of the charging station will for example emit an "occupied" status signal. A ground working device traveling on the traveling path to this occupied charging station on the edge boundary will approach the occupied charging station and receive the status signal in the transmission range of the station transmitter. The status signal is processed in the approaching ground working device and— as a response to the received status signal—adopts a traveling path on which the ground working device first leaves the edge boundary in the direction of the operating region, bypasses the occupied charging station along an in particular programmed traveling path, to then return to the edge boundary. The ground working device then continues to follow the edge boundary to a next—free—charging station.

The edge boundary may be a physical boundary wire which surrounds the operating region of the ground working system, and consequently bounds it.

The edge boundary may advantageously also be configured as a virtual edge boundary. Thus, the ground working device may have an internal map, via which it knows the position of the charging stations. The traveling path of the ground working device to the charging station therefore does not necessarily have to go along the edge boundary; it is also expedient for the ground working device to go directly to the charging station—for example by using the internal map. Advantageously, the ground working device receives the status signal of the station transmitters of all the charging stations, in particular in the entire operating region, and can then go directly to a free charging station.

If the edge boundary is formed by a boundary wire, the boundary wire is continued uninterruptedly in the region of the charging station. Electrically connected to the boundary wire is a base station, which transmits a wire signal on the boundary wire.

In an advantageous embodiment, the base station of the ground working system and the charging station of the ground working system are configured structurally identically. While the base station is connected to the ends of the wire loop of the boundary wire, the boundary wire is looped uninterruptedly through a further charging station. The charging station is merely set up on the boundary wire, without electrical connection work having to be carried out. The charging station may be positioned by a user at any desired point of the boundary wire, removed at any time or easily relocated. The user does not have to perform any adaptation measures or special settings on either the ground working system itself or the charging station. The charging station merely has to be positioned on the boundary wire. It may be advantageous to connect the charging station—by a plug—to an electrical voltage network.

The wire signal transmitted on the boundary wire induces a reception signal in a reception coil of the ground working device, the reception signal being processed in the control unit and used for controlling the ground working device.

In an advantageous embodiment, at least one of the reception coils is configured as a receiver for the status signal. Expenditure on components can thus be reduced.

Advantageously, for the transmission of a charging current, the charging station is provided with a contact tab, which is intended for electrical connection to a contact socket of the ground working device. When the ground working device enters the charging station, at the same time an electrical connection for the transmission of the charging current is established.

In an advantageous embodiment, the battery of a ground working device may be charged contactlessly in the charging station. To this end, the charging station has a correspondingly powerful field coil and the ground working device has a charging coil.

The station transmitter of the charging station advantageously has a radio radiation characteristic that is directed towards the operating region bounded by the boundary wire. As a result, it can be ensured that radio exposure outside the boundary wire is low. Interference with other equipment is avoided.

The station transmitter is expediently a local transmitter and sets up a radio connection with the ground working device. Such a radio connection may advantageously be an infrared connection, a Bluetooth radio connection, an NFC radio connection or similar radio connection. These radio connections have only a small propagation range, and thus cannot disturb other autonomous ground working devices operating in the vicinity.

In particular, the ground working device is a self-driving lawnmower.

Further advantageous embodiments are provided by any desired combination of the features specified and the embodiments described.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
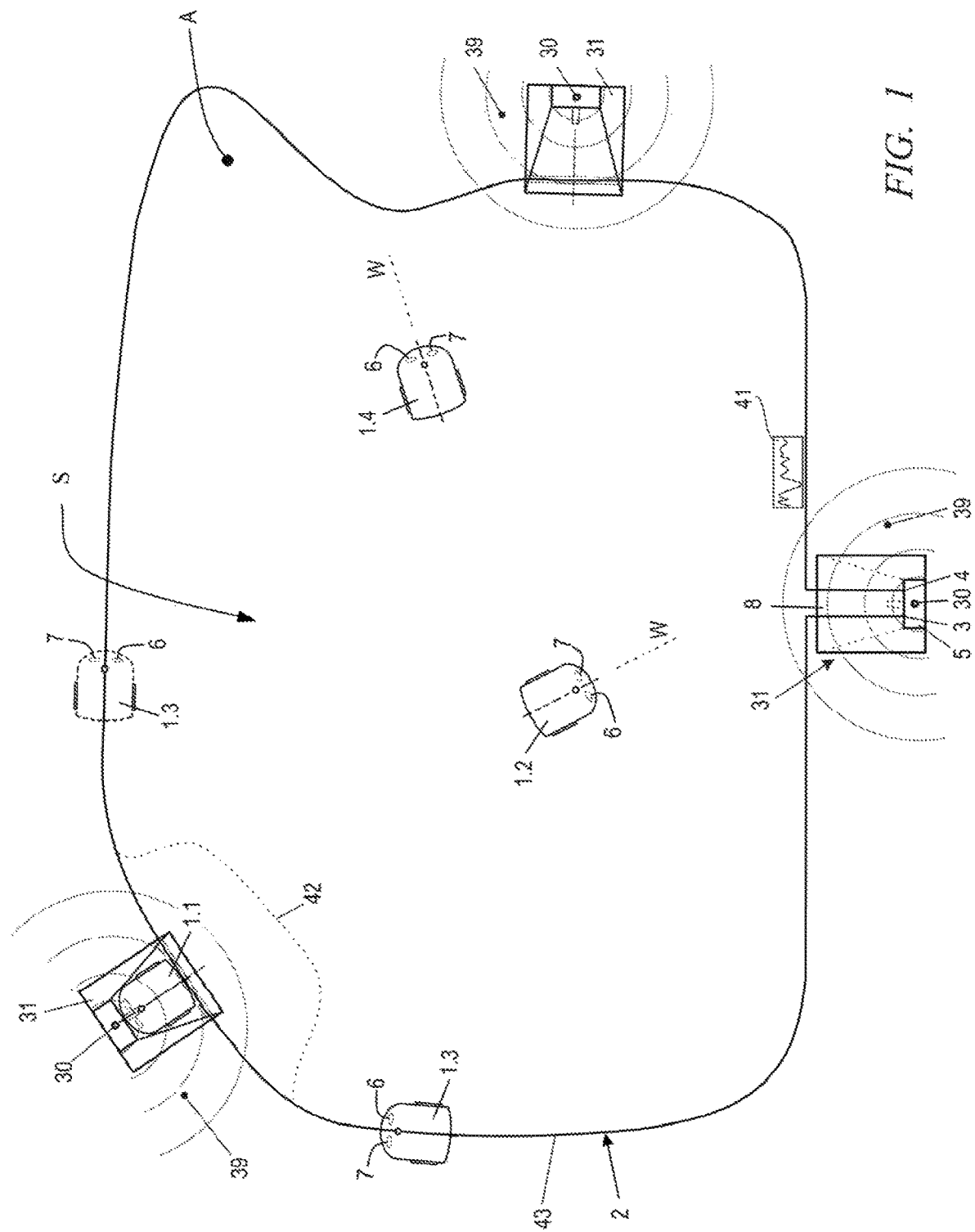
FIG. 1 shows a schematic representation of a ground working system including multiple ground working devices driving themselves in an operating region.

The ground working system S represented in FIG. 1 includes at least one self-driving ground working device 1.1, 1.2, 1.3 and 1.4 for working a predetermined operating region A. In the embodiment, multiple, in particular four, ground working devices 1.1, 1.2, 1.3 and 1.4 for working the predetermined operating region A in a combined manner are shown. The ground working system S may include fewer or more ground working devices. Each individual ground working device 1.1, 1.2, 1.3 and 1.4 operates autonomously and travels automatically within the operating region A along a random, predetermined or automatically planned traveling path W.

In the embodiment shown, as in FIG. 1, the operating region A of the ground working system S is bounded by an edge boundary 2. The edge boundary 2 may be variously formed. The edge boundary 2 may advantageously be determined by map coordinates, by radio beacons, by GPS satellites or the like. In the embodiment shown, the edge boundary 2 is formed by a boundary wire 43, which surrounds the operating region A. The boundary wire 43 shown by way of example is laid in particular as a closed wire loop, the ends 3, 4 of the boundary wire 43 being connected to a transmission unit 5. The transmission unit 5 transmits —preferably at fixed time intervals—onto the boundary wire 43 an electrical wire signal 41, the electromagnetic field of which induces a reception signal in the reception coils 6 and 7 of each individual ground working device 1.1 to 1.4 traveling in the operating region A.

The transmission unit 5 is part of a base station 8, which transmits the wire signal 41 for the directional control of the ground working devices 1.1, 1.2, 1.3 and 1.4. In FIG. 1, the base station 8 is advantageously configured at the same time as a charging station 31.

Figure 2:
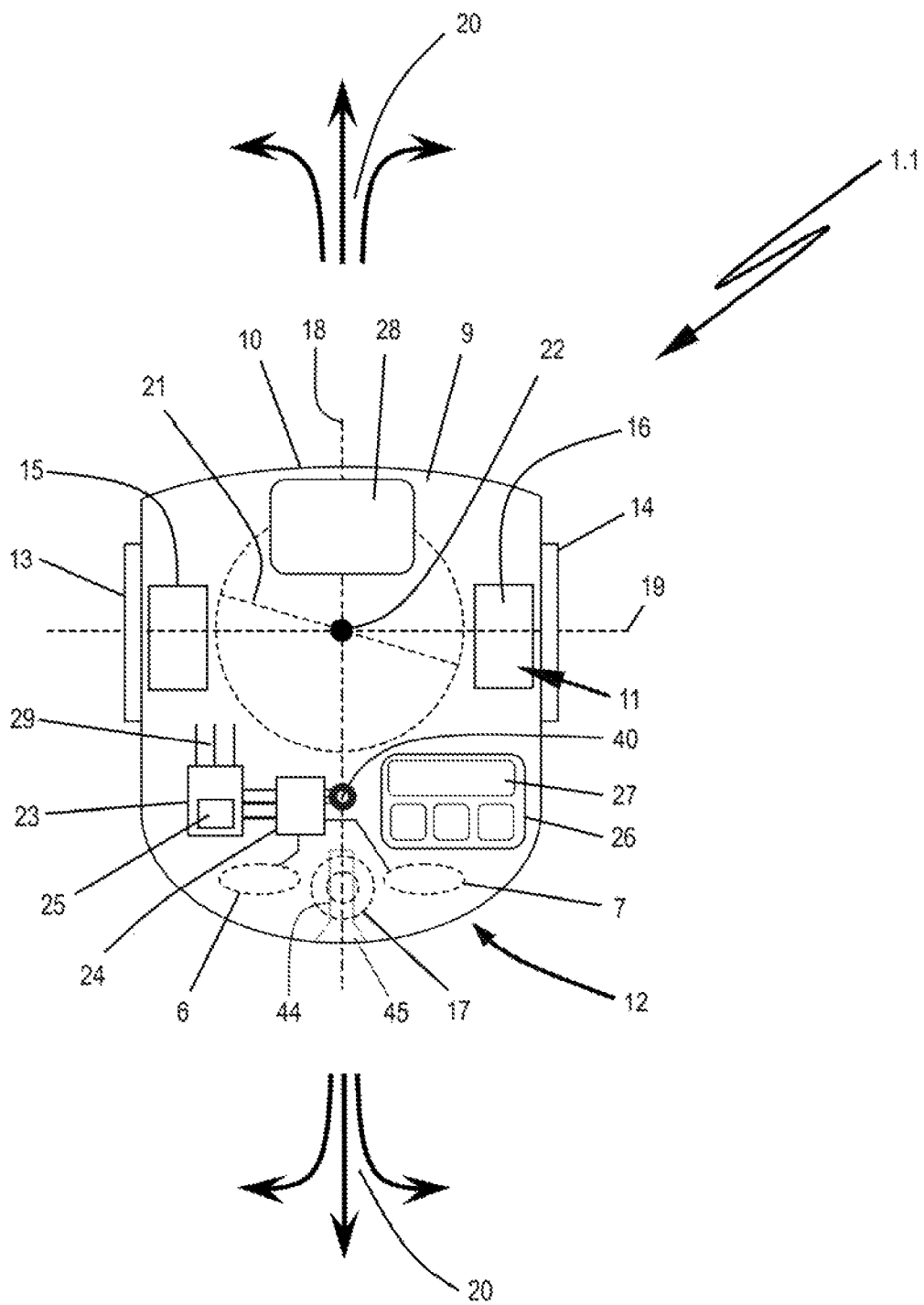
FIG. 2 shows a schematic representation of the construction of a ground working device in the example of a self-driving lawnmower; and, FIG. 3 shows a charging station in a schematic representation.

Schematically shown in plan view in FIG. 2 is a ground working device 1.1, which is configured as a lawnmower 10. The representation of the autonomously operating, self-driving lawnmower 10 is given by way of example. The ground working device 1.1 may also be configured as a scarifier, road sweeper, vacuum cleaner, autonomous ride-on lawnmower or similar ground working device.

The ground working device 1.1 shown as a lawnmower 10 in FIG. 2 consists essentially of a chassis with rear drive wheels 13, 14 with a drive 11. In the embodiment shown, each drive wheel 13, 14 is assigned an electrical drive motor 15, 16, so that the drive wheels 13 and 14 can be driven at different rotational speeds and/or in different directions of rotation for controlling the direction of the lawnmower 10. The drive 11 consequently consists of two mutually independently controllable electric motors.

Provided in the front region 12 of the housing 9 of the lawnmower 10, there is an in particular self-aligning third wheel 17. The third wheel 17 preferably lies on a longitudinal mid-axis 18 of the housing 9. The configuration of a chassis frame with four wheels may be expedient.

The drive wheels 13, 14 of the ground working device 1.1 shown rotate about a common drive axis 19. The drive axis 19—in the plan view of the lawnmower 10 as in FIG. 2—is in particular perpendicular to the longitudinal mid-axis 18 of the housing 9. For traveling in a straight line, the drive wheels 13 and 14 are to be driven synchronously via their electrical drive motors 15 and 16. For negotiating a curve, the drive wheels 13, 14 are driven for example with different rotational speeds by their drive motors 15, 16. Via the drive 11, the ground working device 1.1 can be moved in any desired traveling direction 20 forward or backward according to the arrows depicted.

In the embodiment as in FIG. 2, the ground working device 1.1 has an operating tool 21 between the drive wheels 13 and 14. In the embodiment as a lawnmower 10, the operating tool 21 is a blade rotating about a vertical rotation axis 22.

The control of the electrical drive motors 15 and 16 is carried out via a control unit 23, which is connected via schematically indicated electrical lines 29 to the electrical drive motors 15 and 16.

The wire signal 41 transmitted on the wire loop of the boundary wire 43 is received in the reception coils 6 and 7 of the ground working device 1.1. The reception coils 6 and 7 lie in the front region 12 of the housing 9, respectively on one side of the longitudinal mid-axis 18 of the ground working device 1.1. The reception signals induced in the reception coils 6 and 7 are delivered to a common evaluation unit 24, which is connected to the control unit 23. Advantageously, the control unit 23 includes a memory 25 for an operating variable, which is expedient for operating the ground working device 1.1. Such an operating variable may be for example the start time of the operation, the duration of the operation, the cutting height (in the case of a configuration as a lawnmower), the traveling distance to a charging station, a mowing schedule as a weekly schedule or a similar operating variable.

In FIG. 2, an input pad 26, which advantageously has a screen 27 and input keys, is provided for the user to enter information about the operating variable. It may be expedient to configure the screen as a touchscreen, so that it is possible to dispense with input keys.

Each ground working device 1.1, 1.2, 1.3, 1.4 may also have a further receiver 40, which receives radio signals or infrared signals of a station transmitter 30, which is provided at a charging station 31. The station transmitter 30 transmits signals to the receiver 40 of the ground working device 1.1. This wireless communication connection between the station transmitter 30 and the receiver 40 is advantageously configured as a radio link or the like. Possible radio links may be WLAN connections, Bluetooth connections, GSM connections, NFC connections or similar wireless connections, in particular near-field connections. An infrared connection is advantageous.

The electrical supply to the control unit 23 and to all its components, the electrical supply to the electrical drive 11 and also the electrical supply to the receiver 40 are ensured by an in-device battery 28. The battery 28 is preferably inserted in the housing 9 of the ground working device 1.1.

During the operation of the ground working system S, the ground working devices 1.1, 1.2, 1.3 and 1.4 are made to travel independently of one another in the operating region A to be worked, as a result of corresponding control of the drive motors 15 and 16. Each individual ground working device 1.1, 1.2, 1.3 and 1.4 operates autonomously in accordance with the information of an operating variable in its memory 25.

During the operation of the ground working devices 1.1, 1.2, 1.3 and 1.4, the battery charge decreases on account of the electrical loads that are operated. The discharge of the batteries 28 of the various ground working devices 1.1, 1.2 1.3 and 1.4 may vary, depending on which operating power the operating tool 21 and the drive 11 consume. If a battery 28 of a ground working device 1.1, 1.2, 1.3, 1.4 has to be charged, the control unit 23 moves the corresponding ground working device 1.1, 1.2, 1.3, 1.4 to the edge boundary 2, in the embodiment to the boundary wire 43, as shown in FIG. 1 in the example of the ground working device 1.3. In the embodiment, the reception coils 6 and 7 of the ground working device 1.3 consequently lie respectively on one side of the edge boundary 2 or of the boundary wire 43, whereby traveling along the edge boundary 2 or the boundary wire 43 is ensured in an easy way.

Figure 3:
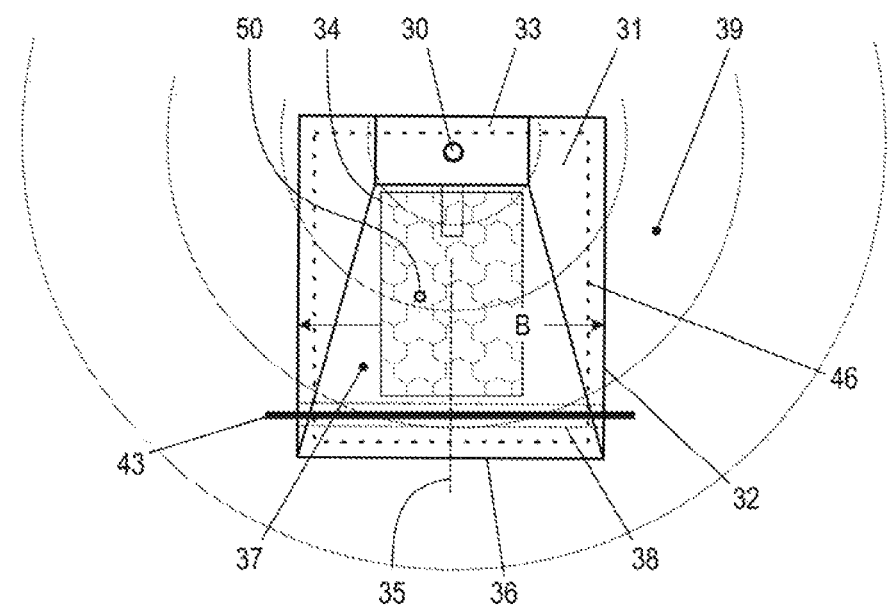

The ground working system S has in particular multiple charging stations 31. In FIG. 3, a charging station 31 is shown enlarged. By way of example, a charging station 31 consists essentially of a base plate 32, which has at one end a housing head 33 with a contact tab 34. The contact tab 34 is preferably aligned with a longitudinal mid-axis 35 of the charging station 31. The base plate 32 may expediently have a ramp 37, rising from a front edge 36 to the contact tab 34. Transversely in relation to the longitudinal mid-axis 35, a receiving channel 38 may be formed in the base plate 32. The receiving channel 38 preferably lies facing the ground of the operating region A. The receiving channel 38 preferably extends over the entire width B of the base plate 32.

In the embodiment shown, the housing head 33 also has a station transmitter 30 as a radio transmitter. The station transmitter has a radio radiation characteristic 39. The radio radiation characteristic 39 is configured in such a way that the radio radiation is directed towards the operating region A bounded by the boundary wire 43, as represented in FIG. 1.

As an alternative to an electrical connection between a contact tab 34 and a contact socket 44 for supplying a charging current, it may be envisaged to charge the battery 28 of a ground working device 1.1, 1.2, 1.3, 1.4 contactlessly in the charging station 31. Schematically indicated in FIG. 3 is a charging coil 50, via which a charging current is transferred from the charging station 31 to a reception coil in the ground working device.

Shown at the top left in FIG. 1 is a ground working device 1.1 that has entered a charging station 31. In the parking position shown of the ground working device 1.1, the contact tab 34 engages in a contact socket 44 of the ground working device 1.1 and establishes an electrical connection between the charging station and the ground working device 1.1. The battery 28 of the ground working device 1.1 is charged with a charging current via the electrical connection including the contact tab 34 and the contact socket 44. The contact socket 44 lies in the front region 12 of the housing 9 of the ground working device 1.1. The longitudinal mid-axis 18 of the housing 9 advantageously divides the contact socket 44. As FIG. 2 shows, the contact socket 44 is formed with a funnel-like contact mouth 45 (FIG. 3), which ensures easy insertion of the contact tab 34 into the contact socket 44 when the ground working device 1.1 is entering the charging station.

Once a ground working device 1.1 has entered a charging station 31 and is in the parking position shown at the top left in FIG. 1, the battery 28 of the ground working device 1.1 is charged. The charging station 31 detects the presence of the ground working device 1.1 in the charging station 31—at least when the charging current is flowing—and transmits a status signal via the station transmitter 30, preferably configured as a radio transmitter. This status signal is transmitted repeatedly as long as the ground working device 1.1 is being charged in the charging station 31. It may also be advantageous to emit a status signal continuously.

The status signal may for example be emitted when the charging station 31 is occupied by a docked ground working device, when the charging station is not operational because of a fault or the intervention of a user is required before the next time a battery is charged. It may also be expedient to transmit the status signal when and only when the charging station is ready for charging a battery.

As an alternative or in addition to the station transmitter 30, it may be envisaged to lay in the base plate 32 a wire loop 46 (FIG. 3), on which a status signal is transmitted. This status signal may preferably be picked up by the reception coils 6, 7 of the ground working device 1.1 and processed by the control unit 23. This makes it possible to dispense with an additional reception unit for a radio signal. By differing configuration of the signal, a status signal on the wire loop 46 can be distinguished from a wire signal 41 on the boundary wire 43.

It may be advantageous to configure at least one reception coil 6 or 7 as a receiver 40 for the status signal. In this case, the reception coil 6 or 7 configured as a receiver 40 may advantageously receive both a status signal emitted by the station transmitter 30 and/or a status signal emitted for example via the wire loop 46.

If, during the operation of the ground working system S, a ground working device, for example the ground working device 1.3 represented in FIG. 1, has to be charged, it advantageously travels along the edge boundary 2 or along the boundary wire 43 until it comes to a first charging station 31. If this charging station 31 is occupied, for example the receiver 40 of the ground working device 1.3 will receive the status signal "occupied" from the station transmitter 30. The status signal received by the receiver 40 is fed to the evaluation unit 24, which passes on a corresponding signal to the control unit 23. When it receives the status signal "occupied", the control unit 23 will control the drive 11 of the ground working device 1.3 in such a way that it expediently bypasses the occupied charging station 31 on the traveling path 42 represented by dashed lines in FIG. 1. The edge boundary 2 is left in the direction of the operating region A, the occupied charging station 31 is bypassed and it is steered back to the edge boundary 2. After reaching the edge boundary 2 or the boundary wire 43 again, the ground working device 1.3 will continue along the boundary wire 43 until it comes to a next —unoccupied—charging station 31. There, the ground working device 1.3 will enter and charge its battery 28.

There may be any number of charging stations 31 arranged along the edge boundary 2 or the boundary wire 43. A charging station 31 is simply positioned on the edge boundary 2 or on the boundary wire 43, the boundary wire 43 being continued uninterruptedly in the region of the charging station 31. Preferably, the boundary wire 43 runs in the receiving channel 38 of the base plate 32 of the charging station 31. As a result, a predetermined alignment of the charging station 31 in relation to the boundary wire 43 can be ensured. It is thus advantageous if the boundary wire 43 crosses the longitudinal mid-axis 35 of the charging station 31 perpendicularly. The ground working device 1.3 coming along in particular on the boundary wire 43 consequently approaches in a traveling direction perpendicular to the longitudinal mid-axis 35. As a result, a predetermined traveling path 42 for bypassing an occupied charging station 31 can be precisely predetermined.

As FIG. 1 shows, two charging stations 31 are positioned at freely chosen locations on the boundary wire 43. The boundary wire 43 is in each case looped uninterruptedly through the charging station 31.

In a particular configuration, the base station 8 is configured in the same way as the charging station 31, as shown in FIG. 1. It may be envisaged to configure each charging station 31 at the same time as a base station 8. The wire loop of the boundary wire 43 is only connected to a transmission unit 5 of one base station 8. The further base stations 8 are only used as a charging station 31. A transmission unit 5 present in a charging station 31 is not used or is deactivated.

In the embodiment, a physical boundary wire 43 is given as the edge boundary 2. Within the scope of the invention, an edge boundary 2 may also be a virtual edge boundary, which is for example set up via navigation data such as satellite navigation or radio beacons. There is also the possibility of storing an internal map in the ground working device 1.1, 1.2, 1.3, 1.4, on the basis of which the ground working device 1.1, 1.2, 1.3, 1.4 orients itself and in which the edge boundary 2 is entered. A further possibility for the edge boundary 2 is—in particular in the case of lawnmowers—an optical detection of the edge boundary. Thus, an autonomously traveling lawnmower may be provided with a camera, which detects the edge of the area of lawn. If the edge of the area of lawn is detected, the ground working device steers back onto the area of lawn.

In particular if the operating region A is worked by multiple ground working devices 1.1, 1.2, 1.3, 1.4, the control and management of the multiple ground working devices 1.1, 1.2, 1.3, 1.4 expediently takes place via a central control unit, which may for example be configured as a server. Thus, via a central server, a team including any desired number of ground working devices 1.1, 1.2, 1.3, 1.4 can for example adapt the working time in a way corresponding to the progress made in work. Also, via communication between the ground working devices 1.1, 1.2, 1.3, 1.4 and for example a server as a central control unit of the team, an adaptation of the operating times can be performed, as can a change of operating variables stored in the ground working device 1.1, 1.2, 1.3.

It is understood that the foregoing description is that of the preferred embodiments of the invention and that various changes and modifications may be made thereto without departing from the spirit and scope of the invention as defined in the appended claims.

What is claimed is:

1. A ground working system comprising:
   at least one self-driving ground working device, wherein an operating region (A) of said at least one self-driving ground working device is determined by an edge boundary;
   a boundary wire forming said edge boundary;
   said at least one self-driving ground working device being configured to travel automatically within said operating region (A) along a traveling path (W);
   said at least one self-driving ground working device having a drive, a control unit and an in-device battery for supplying energy to the self-driving ground working device;
   at least one charging station for charging said in-device battery of said at least one self-driving ground working device;
   one of said at least one charging stations being set up on said edge boundary without interrupting said edge boundary;
   said boundary wire being continued uninterruptedly in a region of said at least one charging station on said edge boundary;
   said at least one self-driving ground working device being configured to go to said at least one charging station for charging said in-device battery; and,
   said boundary wire being looped uninterruptedly through said at least one charging station on said edge boundary.

2. The ground working system of claim 1, wherein said at least one self-driving ground working device is configured to go to said one of said at least one charging station on said edge boundary.

3. The ground working system of claim 1, wherein:
   said at least one charging station includes a station transmitter; and,
   said station transmitter transmits a status signal in dependence on one of said at least one self-driving ground working device docked in said at least one charging station.

4. The ground working system of claim 3, wherein:
   said at least one self-driving ground working device has a receiver; and,
   said status signal is received by said receiver and processed in the self-driving ground working device.

5. The ground working system of claim 3, wherein said station transmitter has a radio radiation characteristic that is directed toward said operating region (A) determined by said edge boundary.

6. The ground working system of claim 3, wherein said station transmitter is configured to set up a radio connection with said at least one self-driving ground working device.

7. The ground working system of claim 3, wherein said station transmitter is configured to set up an infrared connection with said at least one self-driving ground working device.

8. The ground working system of claim 1, wherein multiple autonomously operating ones of said self-driving ground working devices are arranged in said operating region (A).

9. The ground working system of claim 1 further comprising a base station electrically connected to said boundary wire and configured to transmit a wire signal on said boundary wire.

10. The ground working system of claim 9, wherein said base station and said at least one charging station are configured structurally identical.

11. The ground working system of claim 9, wherein:
    said at least one self-driving ground working device includes at least one reception coil; and,
    said wire signal transmitted on the boundary wire induces a reception signal in said reception coil of said at least one self-driving ground working device and said reception signal is processed in said control unit and used for controlling said at least one self-driving ground working device.

12. The ground working system of claim 11, wherein:
    said at least one charging station includes a station transmitter;
    said station transmitter transmits a status signal in dependence on one of said at least one self-driving ground working device docked in said at least one charging station;
    said at least one self-driving ground working device has a receiver for said status signal; and,
    said at least one reception coil forms the receiver for said status signal.

13. The ground working system of claim 1, wherein said in-device battery of said at least one self-driving ground working device is configured to be charged contactlessly in said at least one charging station.

14. The ground working system of claim 1, wherein said at least one self-driving ground working device is a self-driving lawnmower.

15. A ground working system comprising:
    at least one self-driving ground working device, wherein an operating region (A) of said at least one self-driving ground working device is determined by an edge boundary;
    said at least one self-driving ground working device being configured to travel automatically within said operating region (A) along a traveling path (W);
    said at least one self-driving ground working device having a drive, a control unit and an in-device battery for supplying energy to the self-driving ground working device;
    at least one charging station for charging said in-device battery of said at least one self-driving ground working device;
    one of said at least one charging stations being set up on said edge boundary without interrupting said edge boundary;
    said at least one self-driving ground working device being configured to go to said at least one charging station for charging said in-device battery;
    said at least one self-driving ground working device having a contact socket; and,
    said at least one charging station having a contact tab for an electrical connection to said contact socket for transmission of a charging current.

16. A ground working system comprising:
    at least one self-driving ground working device, wherein an operating region (A) of said at least one self-driving ground working device is determined by an edge boundary;
    a boundary wire forming said edge boundary and having first and second ends;
    a transmission unit connected to said first and second ends of said boundary wire;
    said transmission unit being configured to transmit an electrical wire signal on said boundary wire;
    said electrical wire signal being an electromagnetic field;
    said at least one self-driving ground working device having a drive, reception coils for said electromagnetic field of said wire signal, a control unit and an in-device battery for supplying energy to said self-driving ground working device;

said at least one self-driving ground working device being configured to travel automatically within said operating region (A) along a traveling path (W);

at least one charging station for charging said in-device battery of said at least one self-driving ground working device;

one of said at least one charging stations being set up on said edge boundary without interrupting said edge boundary;

said boundary wire being continued uninterruptedly in a region of said at least one charging station on said edge boundary;

said at least one self-driving ground working device being configured to go to said at least one charging station for charging said in-device battery; and, said boundary wire being looped uninterruptedly through said at least one charging station on said edge boundary.

* * * * *